United States Patent [19]

Kirchler

[11] Patent Number: 4,884,721

[45] Date of Patent: Dec. 5, 1989

[54] COOLING HOLDER FOR HAND-HELD WHIPPED CREAM DISPENSER

[76] Inventor: Manfred Kirchler, Mutterstrasse 5, Feldkirch, Austria

[21] Appl. No.: 205,438

[22] Filed: Jun. 10, 1988

[30] Foreign Application Priority Data

Jun. 17, 1987 [AT] Austria .................................. 1549/87

[51] Int. Cl.$^4$ ............................................. B67D 5/62
[52] U.S. Cl. .................. 222/146.6; 222/181; 222/325; 62/257; 62/371
[58] Field of Search ............... 222/146.1, 146.5, 146.6, 222/181, 325; 165/80.1–80.3, 58; 62/257, 371

[56] References Cited

U.S. PATENT DOCUMENTS

| | | | |
|---|---|---|---|
| 2,763,406 | 9/1956 | Countryman | 222/402.21 |
| 3,174,291 | 3/1965 | Crawford et al. | |
| 3,412,566 | 11/1968 | Townsend et al. | 165/80.3 |
| 3,884,386 | 5/1975 | Urcola | 221/7 |
| 3,933,275 | 1/1976 | Metzner et al. | 222/146.6 |
| 4,010,749 | 3/1977 | Shaw | 222/54 |
| 4,054,037 | 10/1977 | Yoder | 62/371 |
| 4,255,944 | 3/1981 | Gardner et al. | 62/371 |
| 4,398,830 | 8/1983 | Koerfer | 366/144 |
| 4,484,597 | 11/1984 | Bravo | 222/190 |

FOREIGN PATENT DOCUMENTS

| | | |
|---|---|---|
| 639576 | 12/1937 | Fed. Rep. of Germany . |
| 672427 | 3/1939 | Fed. Rep. of Germany . |
| 1601050 | 5/1970 | Fed. Rep. of Germany . |
| 3417083 | 11/1985 | Fed. Rep. of Germany . |
| 1330745 | 5/1963 | France . |
| 2435821 | 4/1980 | France . |
| 1436365 | 5/1976 | United Kingdom . |

Primary Examiner—Joseph J. Rolla
Assistant Examiner—Steven M. Reiss
Attorney, Agent, or Firm—Toren, McGeady & Associates

[57] ABSTRACT

A holder (8) serves to store a device (1) for producing whipped cream in such a way that it is ready for use. The device (1) comprises a cylindrical housing (2) with an outlet nozzle (4) on one end thereof. In the housing, there is a supply space for cream (7) and also an operating mechanism for producing whipped cream. The holder (8) has a hollow space (9) constructed so as to correspond to the shape of the housing (2). Portions of the wall (12) of the hollow space (9) are formed from heat conducting material. A Peltier element (13) is connected to the wall by its cold side. The remaining portion of the wall (10) of the hollow space (9) is thermally insulated. The holder can be arranged on a support wall or can stand on a counter. The device is accordingly constantly handy and its contents are cooled.

3 Claims, 1 Drawing Sheet

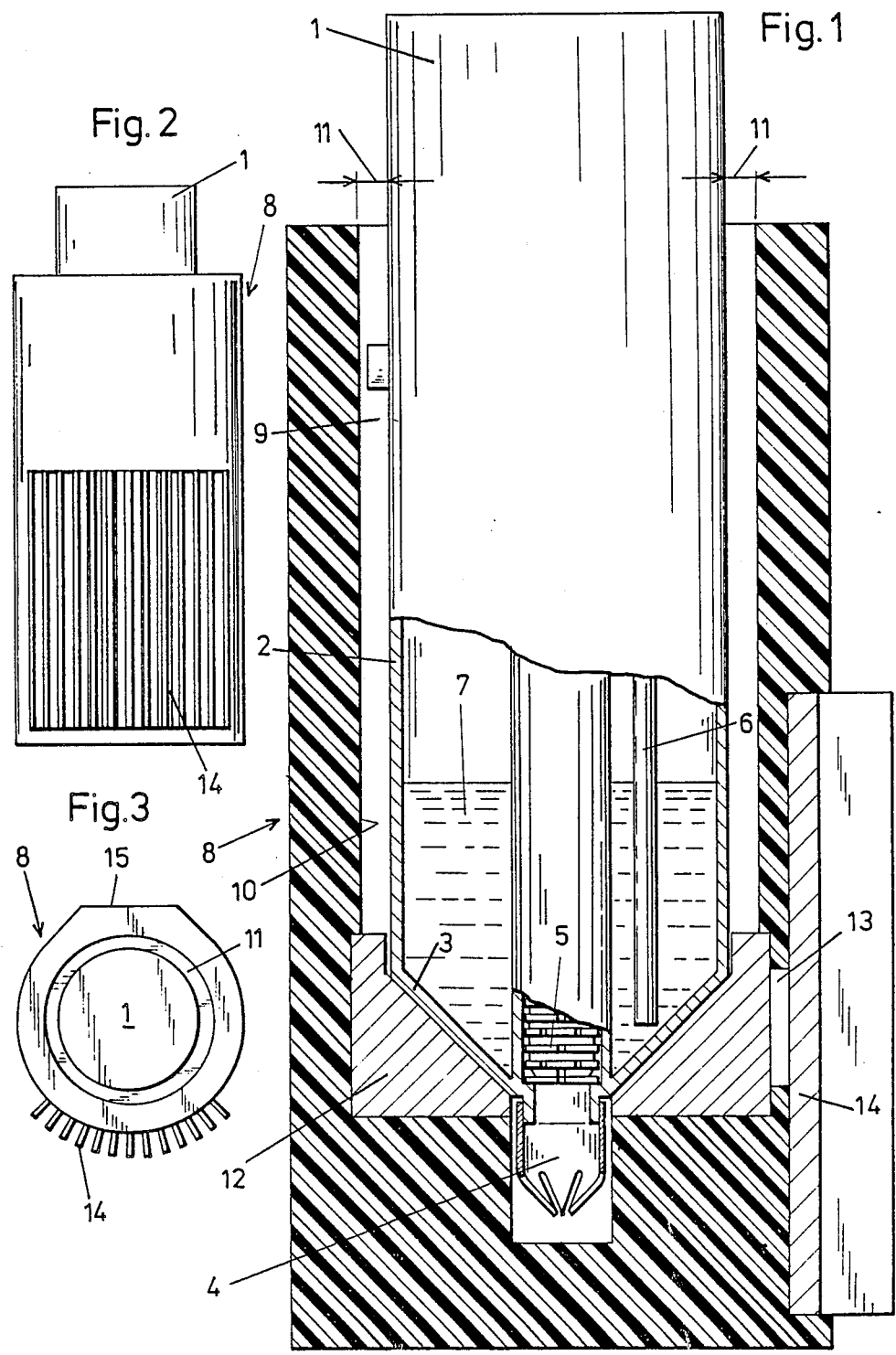

COOLING HOLDER FOR HAND-HELD WHIPPED CREAM DISPENSER

FIELD AND BACKGROUND OF THE INVENTION

The present invention relates in general to holders for food dispensing devices and, in particular, to a new and useful cooling holder having a hollow space for receiving a hand-held dispenser or device for producing and dispensing whipped cream.

Hand-held devices or dispensers of this type are known. They are used in private households, as well as in gastronomic operations, such as restaurants. In order to keep the cream supply found in the housing of the device fresh, these devices are kept in refrigerators from which they must be removed when needed. This is very time consuming, particularly in gastronomic operations.

A holder for electrically operated household knives is known from German Pat. No. 1,436,365. This holder comprises an elongated vat-like, trough-shaped container manufactured from plastic material and comprising a flange having a substantially rectangular shape which projects out along one longitudinal side of this vat-like container and lies horizontally when the holder is used as directed. U-shaped holders are provided in the outer corner areas of this flange and on its upper surface. These U-shaped holders face one another with their open sides and are arranged so as to stand upright in pairs. The narrow sides of the rectangular flange are somewhat reduced. The vat-like, trough-shaped container serves to receive the knife handle, while the knife, which is insertable in the handle, is placed in the U-shaped holders which are arranged in pairs on the flange. The connection cable for the electrically operated knife is wound around the flange in the area of the aforementioned reduced portions. A holder of this type is thoroughly suitable and is certainly also advisable for the aforementioned purpose. Such a holder is not, however, suitable for household devices or dispensers which are filled with foods or desserts or in which such foods or desserts are stored, especially not if these foods or desserts have only a limited storage life as is the case with hand-held devices or dispensers for the production of whipped cream.

SUMMARY OF THE INVENTION

The present invention is directed to simplifying the handling of such a device or dispenser and to providing a holder for such devices in which the device is kept so as to be easily accessible and the cream supply found in the device can nevertheless be kept fresh.

Accordingly, an object of the present invention is to provide a holder for, and in combination with, a hand-held dispenser of whipped cream, wherein the dispenser comprises a housing having an interior supply space for receiving cream, an outlet nozzle connected to the housing and whipped cream producing means connected to the nozzle for producing and discharging whipped cream from the nozzle, the holder having a wall defining a hollow space for receiving the housing, the hollow space having an open upper end and being of a length which is less than that of the housing so that the housing extends above the hollow space and a Peltier element having a cold side in thermal contact with at least a portion of the wall that is made of heat conducting material, whereby the housing is cooled by the Peltier element.

A further object of the invention is to provide a cooling holder for a hand-held whipped cream dispenser, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a vertical sectional view through a holder, constructed in accordance with the present invention, with a hand-held whipped cream dispensing device therein, shown partly in section and partly in elevation;

FIG. 2 is a side elevational view of the holder plus dispenser of FIG. 1, shown on a reduced scale; and FIG. 3 is a top plan view of the holder and dispenser of FIG. 1, also shown on a reduced scale.

DESCRIPTION OF THE PREFERRED EMBODIMENT

As shown in FIG. 1, a dispenser or device 1 for producing whipped cream, comprises a cylindrical housing 2 having one end constructed as a cone 3 whose tip carries an outlet nozzle 4. In this outlet nozzle 4, a homogenizer 5 opens out of the interior of the housing 2. In addition, a pump, which is not visible in the drawing, a drive motor for the pump, a pressure line and a suction line 6 are accomodated in this housing. The suction line 6 can be seen in part in FIG. 1. An accumulator or battery can also be arranged in this housing as a power supply of the drive motor for the pump. However, the device can also be provided with a power connection. The lower portion of the housing 2, which is shown in FIG. 1 in outline, serves as a supply space for the cream 7, from which whipped cream is produced by means of this device.

The holder 8, which can be produced for the most part from a suitable, stable, thermally insulating plastic foam, for example, comprises a hollow space 9 which extends in the vertical direction and is open at the top, its inner height being smaller than the axial length of the device 1, so that the device received by the holder 8 projects upwardly relative to the holder, as is also clearly and unambiguously illustrated by FIG. 1. This hollow space 9 is constructed to correspond to the shape of the housing 2 of the device 1, wherein the inner dimensioning of the housing 2 of the device 1, is determined in such a way that an intermediate space 11 is left between the side wall 10 of the holder 8 in its hollow space 9, and the outside of the housing 2, which intermediate space 11 facilitates the insertion of the device 1 in the hollow space 9, without impairing the cooling function of the holder, which is explained in the following.

The base 12 of the hollow space 9 is constructed to correspond in shape to the conical end 3 of the device 1 and is produced moreover from a heat conducting material. This base 12 is thus constructed as a hollow cone. Base 12 is connected to the cold side of a Peltier element or thermocouple 13 whose warm side is connected to a section strip 14 so as to conduct heat. The section strip 14 is constructed so as to have a comb-like cross section as best shown in FIG. 3, wherein this section strip 14 extends parallel to the axis of the hollow space 9, and the predominant portion of this section strip 14 is arranged outside the rest of the holder 8 (see also FIG. 2). Strip 14 is thus like a set of radiating fins. The Peltier element 13 is connected to a direct current source and controlling means which are not shown here and which can advisably be integrated into the holder 8. These component parts, which are necessary for the operation of the Peltier element, work electronically, can be accomodated in a compact manner due to their smallness, and can be easily accomodated in this holder.

Although the base 12, which is constructed as a hollow cone, is produced from heat conducting material in the embodiment shown and the wall portions of the holder 8 are produced of foam material, it must be noted that it also lies within the scope of the present invention to produce the inner side wall 10 of the hollow space 9 of heat conducting material and to connect this side wall 10 in a heat conducting manner with the base 12, and/or also to arrange a Peltier element at this side wall 10, in addition, the Peltier element being connected to a heat conducting section. The side wall 10, which is constructed in this way, can extend along the entire inner height of the device or only along a portion of this height.

If a portion 15 of the outer wall of the holder 8 is constructed so as to be flattened (see FIG. 3), the holder 8 can be fastened at a room wall or a cabinet wall, for example. The described embodiment shows a device with a cylindrical housing 2 with a conical end termination. It would be possible in principle to construct the housing 2 as a square and to construct the end termination in a pyramid shape. A flat termination would also be possible in principle. But, in all these cases, it is advisable to shape the base 12 to correspond to the construction of the end of the housing 2. If, rather than the base 12, only the side wall 10 of the hollow space 9, is made of heat conducting material, it can be coupled in the aforementioned manner to a Peltier element 13 so as to conduct heat. Since cold air is known to be heavier than warm air, it is therefore also ensured in this case that the cooled air is kept and remains preserved in the hollow space 9 in spite of the fact that it is open at the top. However, it is advisable to cool such wall portions directly by means of a connection with the Peltier element, the device 1, which is introduced into the holder 8, resting directly against the Peltier element with portions of its housing wall, as is shown and described in connection with FIG. 1.

As already mentioned, it is possible to construct the end termination of the housing 2 with the nozzle 4 so as to be flat. But, as was described above, and shown in the drawing, that surface portion contacting the cooled wall portion of the holder 8 can be enlarged by means of the conical construction of this end, as would be the case in a housing where the end is constructed so as to be flat.

Thanks to the invention, it is possible not only to keep the device for the production of whipped cream constantly accessible, but also to keep the cream stored in the device fresh by means of the particular construction of the holder 8, the goal and object of the invention being to achieve this.

If an accumulator or battery is provided in the housing 2 for the power supply of the drive motor for the pump, which drive motor is not shown here, the holder can also be constructed in such a way that this accumulator is electrically connected to a charging device when the device 1 is inserted in the holder 8, wherein this charging device can likewise be accomodated in the holder 8.

Although the invention is described by means of an embodiment which comprises a built-in motor for driving the pump, it must be remarked that the invention is also usable in connection with devices for producing whipped cream which are conceived differently. Handheld devices which work with a compressed air drive, or devices with gas cartridges, are mentioned here by way of example. Although the invention is shown and described in connection with an embodiment that uses the outlet nozzle 4 which is directed downwardly in the device received by the holder, it is conceivable that the device can also be inserted in the holder in such a way that the outlet nozzle projects in an upward direction.

While a specific embodiment of the invention has been showed and described in detail to illustrate the application of the principles of the invention, it will be understood that the invention may be embodied otherwise without departing from such principles.

The invention claimed is:

1. A holder for a hand-held whipped cream dispenser having a shaped housing containing a supply space for receiving cream, the housing having an outlet nozzle at a cone-shaped end face thereof and containing whipped cream producing means connected to the outlet nozzle so as to produce and discharge whipped cream through the outlet nozzle, the holder comprising: a wall defining an upwardly opening cavity formed so as to correspond to the shape of and accommodate the housing of the dispenser so that at least a portion of the housing extends above the cavity, said wall having at least a portion forming the bottom of the cavity made of heat conducting material; and a Peltier element having a cold side in thermal contact with the portion of the wall made of heat conducting material, and a warm side with a profile strip of heat conducting material and a cone-shaped cross-section, the wall portion forming the bottom of the cavity being formed as a hollow cone corresponding to the shape of the end face of the housing so that the two conical surfaces rest against each other and form an intermediate space between a side wall of the cavity and the housing of the dispenser when the dispenser is received in the holder, so that the outlet nozzle is cooled.

2. A holder as defined in claim 1, wherein the housing is prismatic.

3. A holder as defined in claim 1, wherein the housing is cylindrical.

* * * * *